(12) United States Patent
Nagasaka et al.

(10) Patent No.: US 6,659,900 B2
(45) Date of Patent: Dec. 9, 2003

(54) APPARATUS FOR CONTROLLING VEHICLE TRANSMISSION

(75) Inventors: Chikao Nagasaka, Aichi (JP); Yoshimasa Kunimatsu, Aichi (JP); Masaki Hayashi, Aichi (JP)

(73) Assignee: Kabushiki Kaisha Tokai Rika Denki Seisakusho (JP)

( * ) Notice: Subject to any disclaimer, the term of this patent is extended or adjusted under 35 U.S.C. 154(b) by 0 days.

(21) Appl. No.: 10/087,454

(22) Filed: Feb. 27, 2002

(65) Prior Publication Data
US 2002/0166399 A1 Nov. 14, 2002

(30) Foreign Application Priority Data

Feb. 28, 2001 (JP) ........................................ 2001-054457
Feb. 28, 2001 (JP) ........................................ 2001-054458

(51) Int. Cl.[7] .............................................. F16H 59/08
(52) U.S. Cl. .................. 475/132; 74/473.12; 74/473.35
(58) Field of Search ............................... 74/336 R, 335, 74/473.12, 473.35; 475/132

(56) References Cited

U.S. PATENT DOCUMENTS 6,260,432 B1 * 7/2001 Ehrmaier et al. ........ 74/473.18

FOREIGN PATENT DOCUMENTS

DE 29802183 U1 * 4/1998
DE 19915566 A1 * 12/1999

OTHER PUBLICATIONS

DE 29802183 U1 (Iveco Fiat) Apr. 2, 1998 (abstract) World Patents Index. London, U.K.: Derwent Publications, Ltd. [retrieved on Apr. 29, 2003]. Retrieved from: East.*

* cited by examiner

Primary Examiner—Ankur Parekh
(74) Attorney, Agent, or Firm—Patterson, Thuente, Skaar & Christensen, P.A.

(57) ABSTRACT

A control apparatus for increasing the reliability of the range shifting of the transmission based on the operation of a shift lever. Only when a shift permission switch is operated by a driver and the shift lever is operated does a determination circuit validate the operation of the shift lever. When the shift permission switch is not operated, the determination circuit does not shift the range of the transmission even when the shift lever is moved.

21 Claims, 6 Drawing Sheets

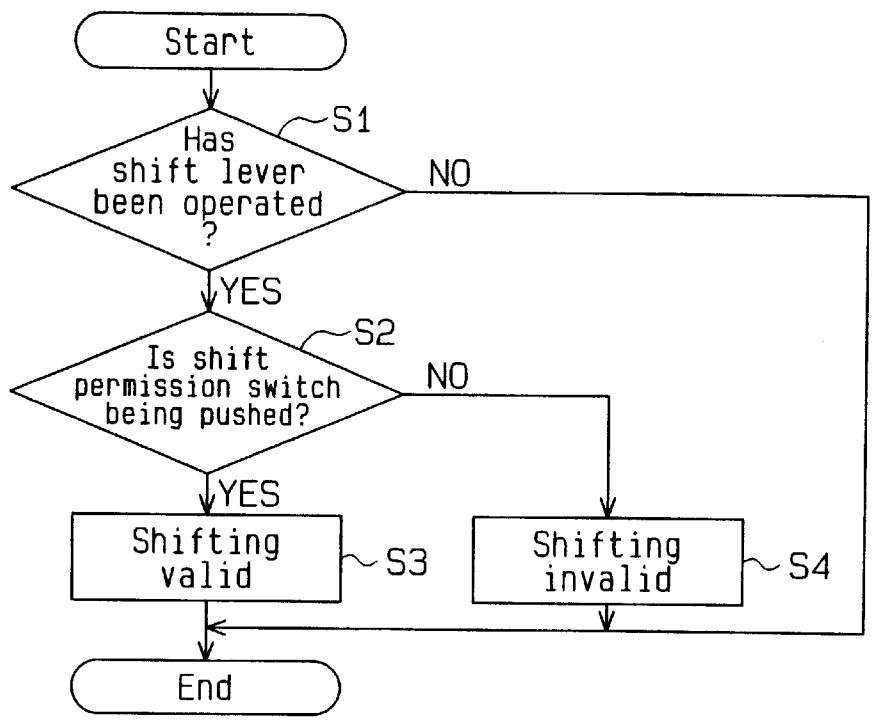
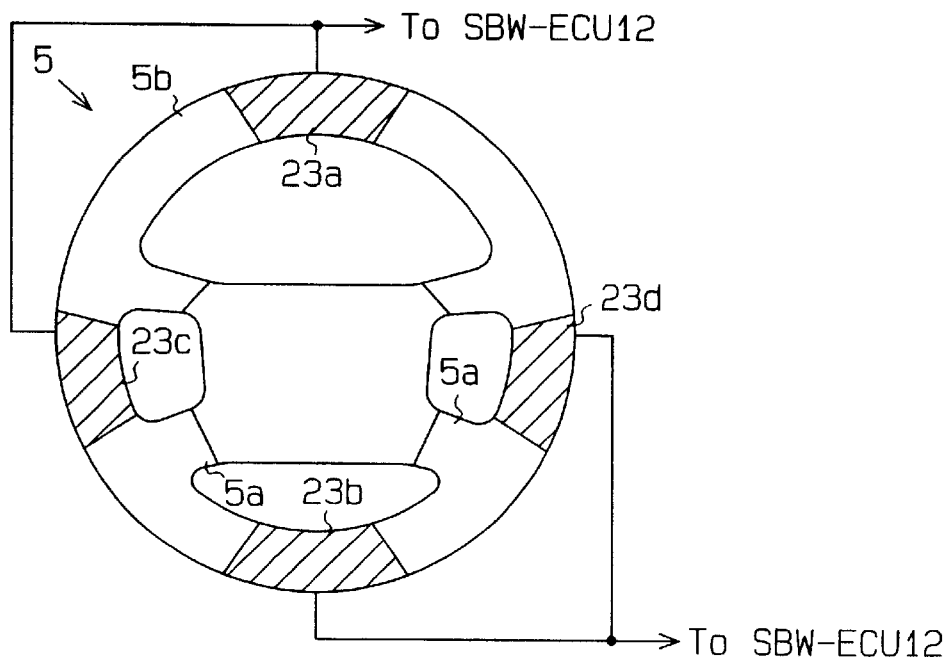

APPARATUS FOR CONTROLLING VEHICLE TRANSMISSION

BACKGROUND OF THE INVENTION

The present invention relates to an apparatus for electrically controlling a transmission of a vehicle.

A shift-by-wire type shift device that electrically controls the shifting of shift ranges in a vehicle transmission is known in the prior art. The conventional shift device electrically detects the operation of the shift lever and operates the actuator in accordance with the detection signal to shift the range of the transmission. In shift-by-wire type shift device, a mechanical link structure for transmitting the operation of the shift lever to the transmission is not necessary. This increases the freedom in laying out the shift lever and passenger compartment accessories and obtains a comfortable passenger compartment environment.

SUMMARY OF THE INVENTION

It is an object of the present invention to provide a vehicle transmission control apparatus that increases reliability with respect to the shifting of the transmission.

To achieve the above object, a first perspective of the present invention provides an apparatus for controlling a vehicle transmission. The apparatus has a shift device operated by a driver to shift a range of the transmission and a determination device for determining whether the operation of the shift device is valid.

Other aspects and advantages of the present invention will become apparent from the following description, taken in conjunction with the accompanying drawings, illustrating by way of example the principles of the invention.

BREIF DESCRIPTION OF THE DRAWINGS

The invention, together with objects and advantages thereof, may best be understood by reference to the following description of the presently preferred embodiments together with the accompanying drawings in which:

FIG. 3 is a flowchart illustrating a range shifting permission determination process that is executed by the control apparatus of FIG. 1;

FIG. 4 shows a modified example of the steering wheel shown in FIG. 2;

Figure 1:
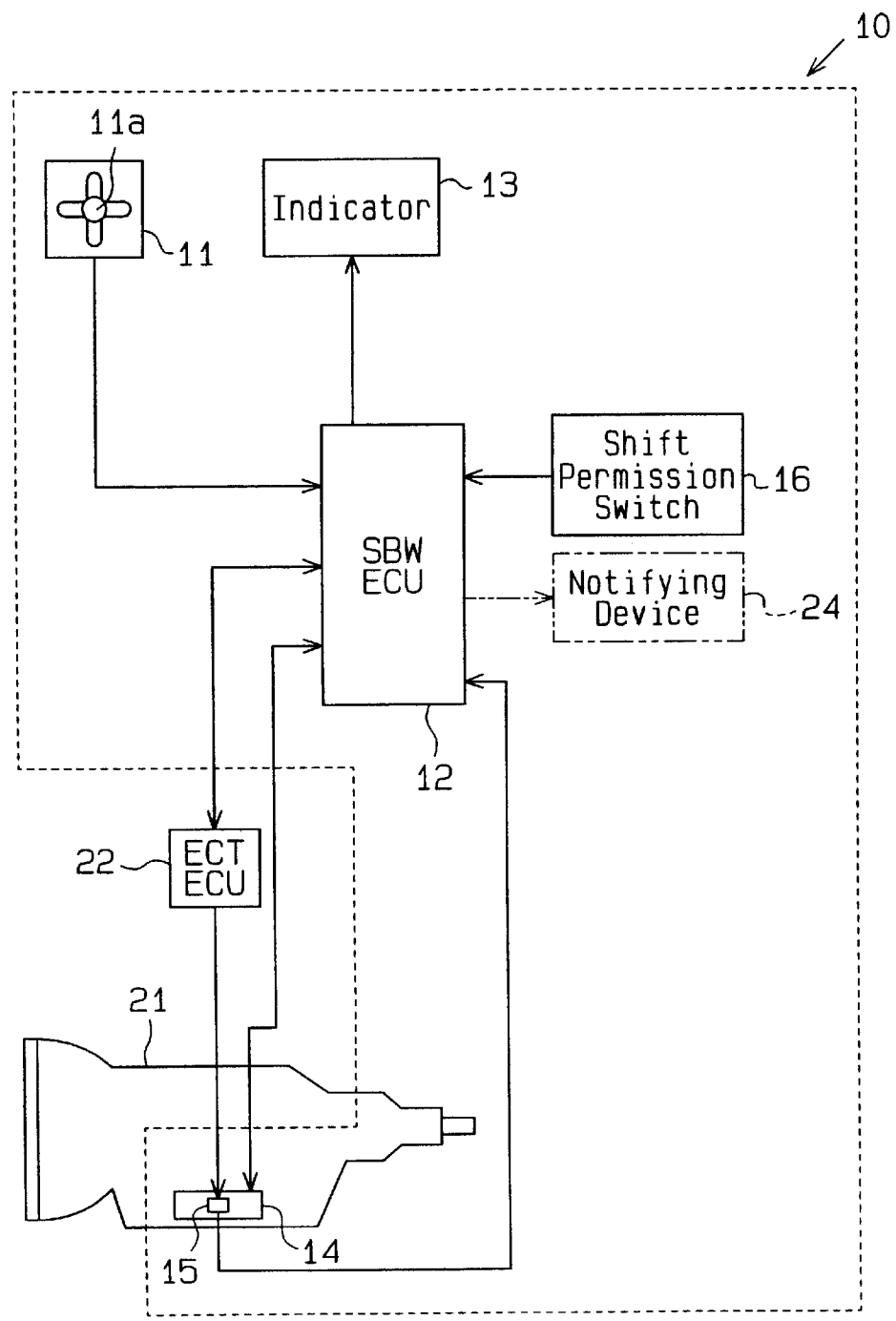
FIG. 1 is a block diagram of a vehicle transmission control apparatus according to a first embodiment of the present invention.
Figure 6:
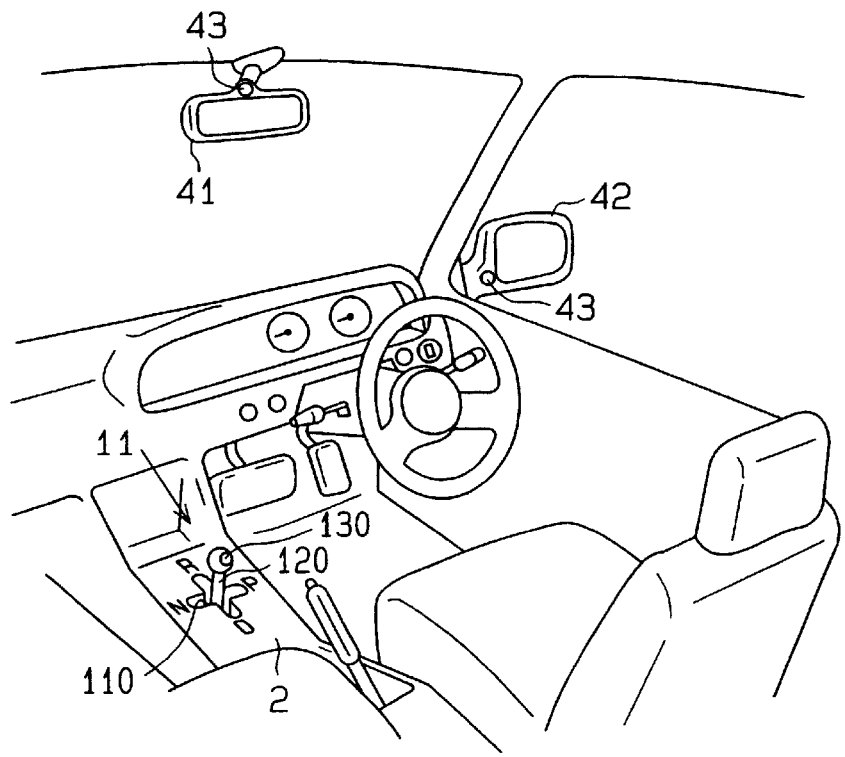
Figure 7:
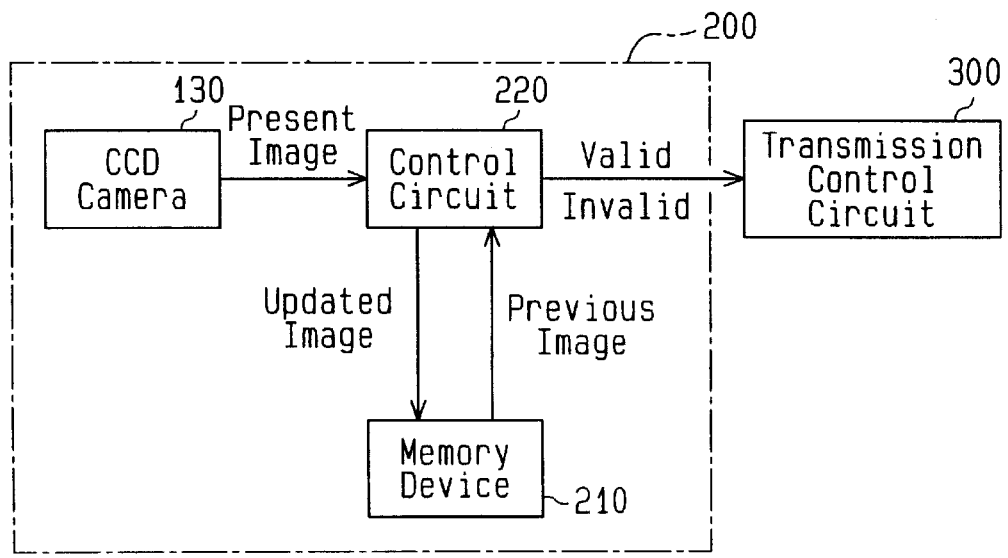

FIGS. 5A, 5B, 5C, and 5D show modified examples of the shift permission switch of FIG. 1;

FIG. 6 is a perspective view showing a passenger compartment in which a monitoring system according to a second embodiment of the present invention is arranged;

FIG. 7 is a block diagram of the monitoring system of FIG. 6; and

Figure 8:
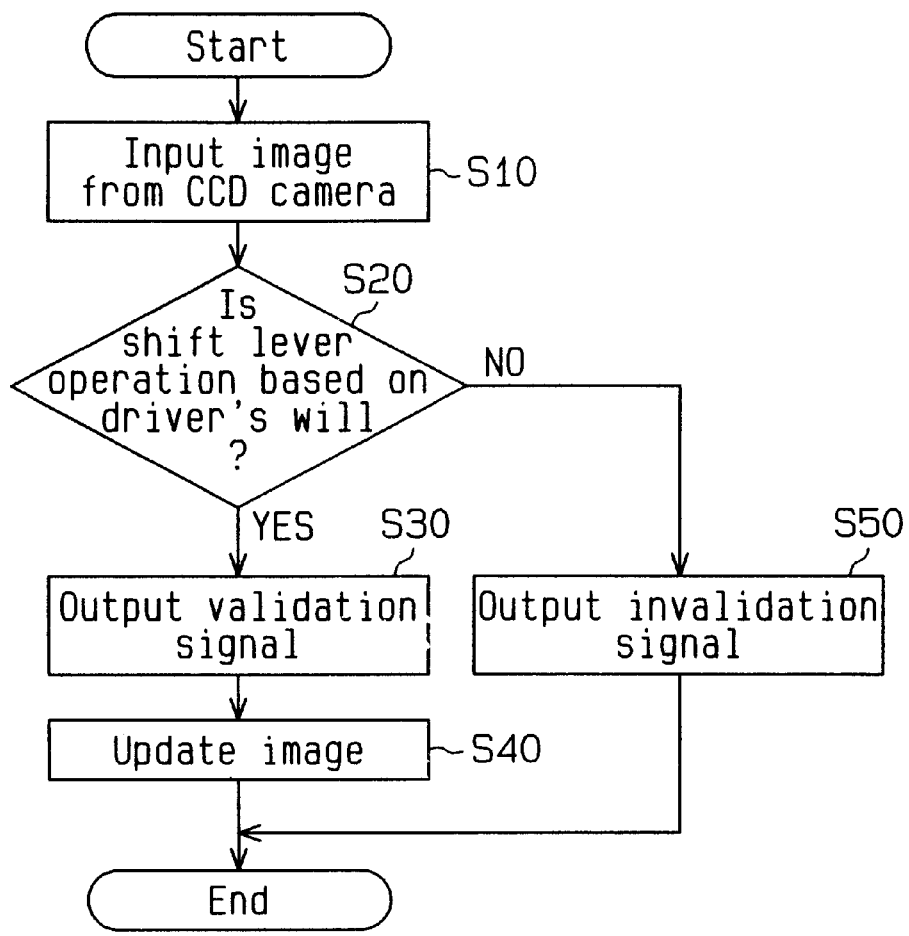

FIG. 8 is a flowchart of the range shifting permission determination process that is executed by the monitoring system of FIG. 7.

DETAILED DESCRIPTION OF THE PREFERRED EMBODIMENTS

A control apparatus 10 of a vehicle transmission 21 according to a first embodiment of the present invention will now be discussed in detail with reference to FIGS. 1 to 3.

As shown in FIG. 1, the control apparatus 10 includes a range selector, or shift device 11, a shift controller (SBW-ECU) 12, an indicator 13, a hydraulic actuator 14, a range detector 15, and a shift permission switch 16. The shift device 11, the indicator 13, the hydraulic actuator 14, the range detector 15, and the shift permission switch 16 are electrically connected to the SBW-ECU 12.

Figure 2:
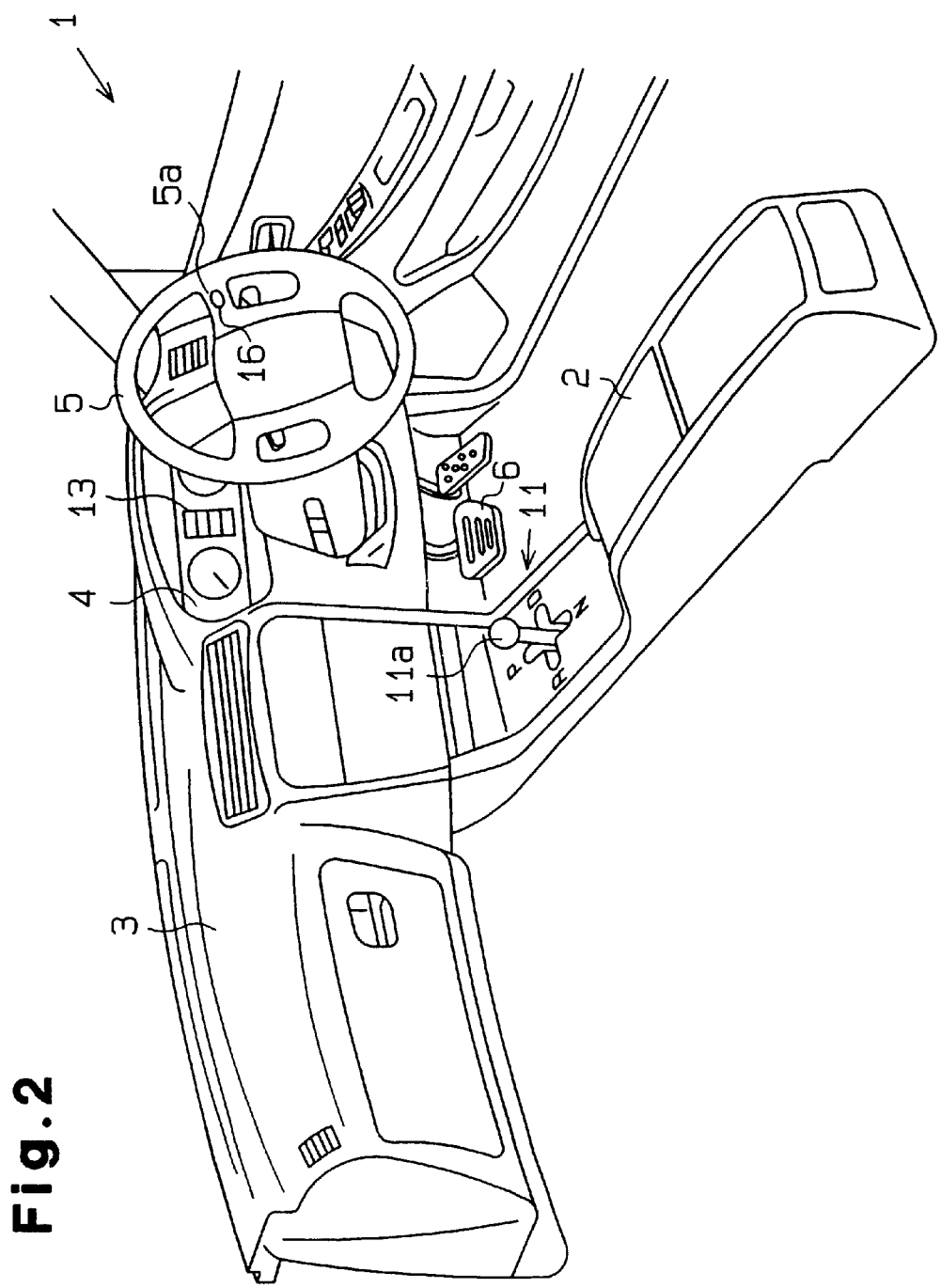
FIG. 2 is a perspective view showing a passenger compartment in which the transmission control apparatus is arranged.

As shown in FIG. 2, the shift device 11 is arranged in a passenger compartment of a vehicle 1. The shift device 11 has a shift switch, or a shift lever 11a, that is arranged on a center console 2. A driver operates the shift lever 11a and selects a desired shift range. More particularly, the shift device 11 has a plurality of operation positions corresponding to a plurality of shift ranges of an automatic transmission 21. Normally, the shift lever 11a is positioned at the intersection of grooves (shift gate) that are formed in a cross-like manner. The shift lever 11a is moved along the shift gate. When the shift lever 11a is inclined forward, the shift range is shifted to a parking (P) range. When the shift lever is inclined rearward, the shift range is shifted to a neutral (N) range. When the shift lever 11a is inclined toward a passenger seat, the shift range is shifted to a reverse (R) range. When the shift lever 11a is inclined toward the driver's seat, the shift range is shifted to a drive (D) range. Accordingly, the range of the transmission 21 is shifted in accordance with the operated direction of the shift lever 11a. The shift device 11 detects the operation of the shift lever 11a and provides the SBW-ECU 12 with an operation signal indicating the operation of the shift lever 11a.

Referring to FIG. 2, the indicator 13 is arranged on a combination meter 4 of an instrument panel 3. The SBW-ECU 12 provides the indicator 13 with a signal indicating the presently selected shift range. The indicator 13 displays the present shift range according to the signal.

The hydraulic actuator 14 is arranged in the automatic transmission 21. The transmission 21 has a gear train that is shifted between a plurality of shift ranges, which include neutral (N), parking (P), drive (D), and reverse (R). The hydraulic actuator 14 has an electromagnetic control valve (not shown) that switches the path of operational oil supplied from the hydraulic pump. The hydraulic actuator 14 electrically controls an electromagnetic control valve to shift the range of the transmission 21.

The range detector 15 is provided in a housing of the transmission 21. The range detector 15 detects the present shift range (P, N, D, R) and provides the SBW-ECU 12 with a detection signal indicating the shift range.

As shown in FIG. 1, the shift permission switch 16 is arranged on the steering wheel 5. More specifically, the shift permission switch 16 is a momentary type push button switch that is arranged on a spoke 5a of the steering wheel 5. The shift permission switch 16 sends the SBW-ECU 12 an operation signal having a high level when pushed.

The SBW-ECU 12 has a microcomputer (not shown) that executes a stored control program. The SBW-ECU 12 receives the operation signal from the shift device 11 and receives a detection signal from the range detector 15. Based on the operation signal and the detection signal, the SBW-ECU 12 controls the hydraulic actuator 14 and shifts the gear range of the transmission 21 according to the control program. For example, when the shift lever 11a is moved to the D position, the shift device 11 provides the operation signal indicating the operation to the SBW-ECU 12. The SBW-ECU 12 drives the hydraulic actuator 14 based on the operation signal to shift the gear range to the D range. The D range corresponds to an automatic driving mode. In the automatic driving mode, an electric control unit (ECT-ECU) 22 that is connected to the SBW-ECU 12 controls the transmission 21 according to the driving conditions of the vehicle (vehicle velocity and throttle angle).

Next, referring to the flowchart of FIG. 3, a range shifting determination process executed by a determination circuit, or the SBW-ECU 12, will be described. The program shown in FIG. 3 is stored in the ROM (not shown) of the SBW-ECU 12. The program may be recorded to a computer readable recording medium other than the ROM.

First, in step S1, the SBW-ECU 12 checks whether or not the shift lever 11a has been operated. More specifically, when receiving the operation signal from the shift device 11, the SBW-ECU 12 determines that the shift lever 11a has been operated (YES). In this case, the process proceeds to S2. When the shift lever 11a has not been operated, the routine is temporarily terminated.

In step S2, the SBW-ECU 12 checks whether or not the shift permission switch 16 is being pushed. More specifically, when receiving the driving signal from the shift permission switch 16, the SBW-ECU 12 determines that the shift permission switch 16 is being pushed (YES). In this case, the process proceeds to step S3.

In step S3, the SBW-ECU 12 determines that the operation of the shift lever 11a is valid and provides the hydraulic actuator 14 with a permission signal that permits range shifting. In other words, the SBW-ECU 12 provides a drive signal, which is based on the operation of the shift lever 11a, to the hydraulic actuator 14. The hydraulic actuator 14 shifts ranges according to the driving signal.

When the permission switch 16 is not pushed in step S2, the process proceeds to step S4.

In step S4, the SBW-ECU 12 determines that the operation of the shift lever 11a is invalid and prohibits range shifting. More specifically, the SBW-ECU 12 does not provide the hydraulic actuator 14 with the drive signal even though the shift device 11 has been operated. In this case, the range of the transmission 21 is not shifted.

Accordingly, the SBW-ECU 12 permits range shifting when the shift device 11 is operated and the shift permission switch 16 is pushed. In other words, as long as the shift permission switch 16 is not pushed, the SBW-ECU 12 prohibits range shifting even when the shift device 11 is operated.

The control apparatus 10 according to the first embodiment has the following advantages.

The SBW-ECU 12 determines that the operation of the shift lever 11a is valid when the shift permission switch 16 is pushed. On the other hand, the SBW-ECU 12 determines that the operation of the shift lever 11a is invalid when the shift permission switch 16 is not pushed. Therefore, the shift range of the transmission 21 does not change just by operating the shift lever 11a. This increases reliability with respect to range shifting.

The shift permission switch 16 is arranged at a position (the steering wheel 5) that is separated from the shift device 11. Therefore, the possibility of the shift device 11 and the shift permission switch 16 both being operated inadvertently decreases and reliability with respect to range shifting is increased.

The shift permission switch 16 is arranged on the steering wheel 5. Normally, the steering wheel 5 is operated by a driver and is not operated by passengers other than the driver. Therefore, reliability with respect to range shifting is increased. Further, since the driver operates the shift permission switch 16 while gripping the steering wheel 5, the drivability of the vehicle 1 is not lowered.

The shift permission switch 16 is a push button switch. Therefore, the operation of the shift permission switch 16 is easy. The shift permission switch 16 has a simple structure and is relatively inexpensive. This decreases the manufacturing cost of the control apparatus 10. Further, the shift permission switch 16 is arranged on the spoke 5a of the steering wheel 5. Thus, the shift permission switch 16 is not operated when the steering wheel 5 is being steered.

The first embodiment may be modified as follows.

The position of the shift permission switch 16 in the first embodiment may be changed. For example, as shown in FIG. 4, pressure sensitive sensors 23a–23d (indicated by the diagonal lines) that are arranged on a rim 5b of the steering wheel 5 may be used as the shift permission switch 16. More specifically, as shown in FIG. 4, the pressure sensitive sensors 23a, 23b, 23c, 23d are respectively embedded in the upper side, lower side, left side, and right side of the rim 5b. The pressure sensitive sensors 23a, 23b, 23c, 23d are electrically connected to the SBW-ECU 12. When the driver applies pressure, which is greater than or equal to a predetermined threshold, to at least one of the pressure sensitive sensors 23a–23d, the pressured pressure sensitive sensor provides the operation signal to the SBW-ECU 12. When the driver grips the rim 5b with a relatively strong force and operates the shift lever 11a, the SBW-ECU 12 determines that the operation of the shift lever 11a is valid and permits range shifting. Therefore, the range shifting operation is simple and the drivability of the vehicle 1 is not decreased.

The shift permission switch 16 of the first embodiment may be arranged on a knob 11b of the shift lever 11a of the shift device 11. For example, as shown in FIGS. 5A–5C, a contact sensor 31, such as a pressure sensitive sensor, is arranged on the knob 11b.

Figure 5A:
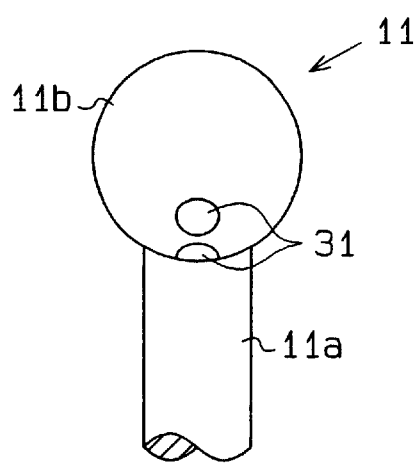

Two contact sensors 31 that are arranged on the knob 11b of the shift lever 11a are shown in FIG. 5A. The two contact sensors 31 preferably face the driver's seat. Only when the driver contacts the two contact sensors 31 and operates the shift lever 11a does the SBW-ECU 12 permit the range shifting of the transmission 21 in accordance with the operation. This prevents the shift lever 11a from being shifted when an object contacts the shift lever 11a and moves the shift lever 11a. Further, since the driver grips the knob 11b to operate the shift lever and shift ranges, the maneuverability of the vehicle 1 increases.

Figure 5B:
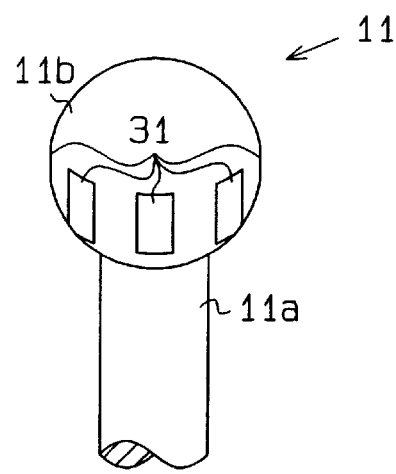
Figure 5C:
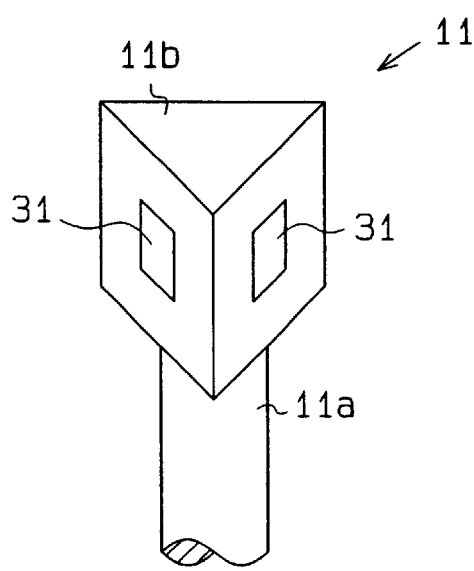

A plurality of (e.g., eight) contact sensors 31 arranged along the entire peripheral surface of the knob 11b are shown in FIG. 5B. A plurality of polygonal (in this case, triangular) contact sensors 31 arranged on the knob 11b are shown in FIG. 5C. It is preferred that the contact sensors 31 are arranged where they may confirm that the driver's hand is gripping the shift lever 11a. Only when all or some of the contact sensors 31 detect contact and the shift lever 11a is operated does the SBW-ECU 12 shift ranges of the transmission 21 according to the operation of the shift lever 11a.

Figure 5D:
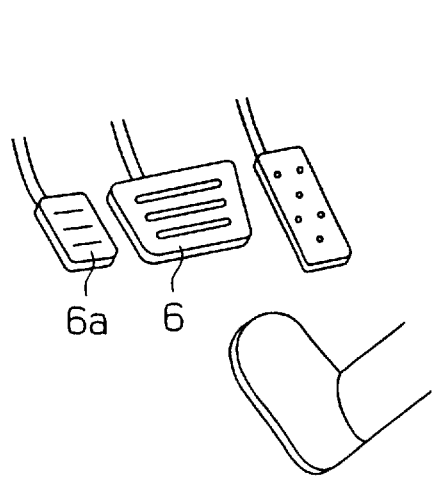

Instead of the shift permission switch 16 of the first embodiment, a shift permission pedal 6a may be used. For example, the shift permission pedal 6a is near the driver's foot (between the brake pedal 6 and the center console 2), as shown in FIG. 5D. The shift permission pedal 6a is electrically connected to the SBW-ECU 12 and provides the SBW-ECU 12 with the operation signal when the shift permission pedal 6a is being depressed. Since passengers other than the driver do not operate the shift permission pedal 6a, reliability with respect to range shifting is increased. When the shift permission pedal 6a is provided at the left side of the brake pedal 6, the shift permission pedal 6a is operated by the left foot of the driver. Therefore, the driver shifts ranges in a manner similar to when shifting ranges with a conventional manual transmission, and the driver may drive the vehicle 1 with the preferred maneuverability.

In the first embodiment, the SBW-ECU 12 validates the operation of the shift lever 11a only when the shift permission switch 16 is being pushed. The SBW-ECU 12 may validate the operation of the shift lever 11a for a predetermined time after the shift permission switch 16 is pushed. This would eliminate the need for the driver to synchronize the operation timing of the shift permission switch 16 and the operation timing of the shift lever 11a. That is, the transmission 21 is allowed to shift ranges when the shift lever 11a is operated even after the pushed shift permission switch 16 is released. This increases the range shifting maneuverability of the transmission 21.

In the first embodiment, the SBW-ECU 12 shifts the range of the transmission 21 according to the operation of the shift lever 11a when the shift permission switch 16 is pushed and the shift lever 11a is operated. However, the SBW-ECU 12 may shift the range of the transmission 21 in accordance with the operation of the shift lever 11a within a predetermined time from when the shift permission switch 16 is pushed after the shift device 11 is operated. In this case, the shift permission switch 16 is used as a switch for confirming the operation of the shift lever 11a.

As shown in FIG. 1, the control apparatus 10 may have a notifying device 24 connected to the SBW-ECU 12. The SBW-ECU 12 activates the notifying device 24 when range shifting is permitted and notifies the driver that range shifting is permitted. An audio output device, such as a buzzer or a horn, or a visual device, such as an indicator lamp, may be used as the notifying device 24.

In the first embodiment, a shift switch such as a rotary switch or a push switch may be used as the shift lever 11a. The shift device 11 can be arranged on the instrument panel 3 or the steering column where the driver may easily operate the shift device 11.

A control apparatus, or a monitoring system 200, of a vehicle transmission 21 according to a second embodiment of the present invention will now be discussed.

As shown in FIG. 6, a shift-by-wire type shift range selector, or the shift device 11, is arranged on the center console 2 between the driver's seat and the passenger seat. The shift device 11 has a cross-like shift gate 110 and a shift switch, or shift lever 120, that is moved along the shift gate 110. The driver operates the shift lever 120 to select a desired shift range.

When the driver wishes to move the vehicle rearward, the driver inclines the shift lever 120 forward. In this case, after the shift lever 120 is temporarily arranged at the R position, the shift lever 120 returns to the intersection of the shift gate 110. When the driver moves the shift lever 120 to the P position, the D position, or the N position, the shift lever 120 returns to the intersection in the shift gate 110 after the shift lever 120 is arranged in the P position, the D position or the N position. That is, the shift device 11 has a momentary structure (a recovery type). The shift range of the transmission 21 is selected according to the operated direction of the shift lever 120. For example, when the shift lever 120 is operated to the D position, the shift range of the transmission 21 enters the drive range D. In the drive range, the gear train of the transmission 21 is automatically shifted between four gears (D1, D2, D3, D4), each of which has a different gear ratio, in accordance with the driving conditions of the vehicle.

A CCD camera 130 is arranged on the upper end of the shift lever 120 for generating an image of the shift lever 120, which is operated by the driver. The monitoring system 200 determines whether the shift lever 120 was operated to shift gears from the image generated by the CCD camera 130.

As shown in FIG. 7, the monitoring system 200 includes the CCD camera 130, a memory device 210, and a determination circuit, or control circuit 220.

The CCD camera 130 sends images of the operation of the shift lever 120 to the control circuit 220. The control circuit 220 retrieves an updated image of the operation of the shift lever 120 from the images generated by the CCD camera 130. The control circuit 220 reads the previous image stored in the memory device 210 and provides the retrieved image (updated image) to the memory device 210. The image stored in the memory device 210 is renewed. The control circuit 220 compares the updated image taken by the CCD camera 130 with the previous image and determines whether the operation of the shift lever 120 is valid or invalid. The control circuit 220 sends a signal (permission signal or prohibition signal) corresponding to the determination result to a transmission control circuit 300. For example, when the control circuit 220 determines that the operation of the shift lever 120 is valid, the control circuit 220 provides the transmission control circuit 300 with the permission signal that permits range shifting. The transmission control circuit 300 shifts the range of the transmission 21 in response to the permission signal. When the control circuit 220 determines that the operation of the shift lever 120 is invalid, the control circuit 220 provides the transmission control circuit 300 with the prohibition signal that prohibits range shifting. In this case, the transmission control circuit 300 does not shift the range of the transmission 21.

The range shifting permission determination process will now be discussed with reference to the flowchart of FIG. 8.

In step S10, the image generated when the shift lever 120 is operated is input to the control circuit 220 by the CCD camera 130. For example, the image generated when the shift lever 120 is moved to the D position is input.

In step S20, the control circuit 220 compares the input image with a previous image generated when the shift lever 120 was operated. When the two images are substantially the same, the control circuit 220 determines that the driver operated the shift lever 120 to shift ranges (YES). In this case, the process proceeds to S30. On the other hand, when the two images are different, the control circuit 220 determines that the driver did not operate the shift lever 120 to shift ranges (NO). In this case, the process proceeds to step S50.

In step S30, the monitoring system 200 provides the transmission control circuit 300 with the permission signal indicating that the operation of the shift lever 120 is valid. The transmission control circuit 300 outputs the control signal for shifting the range.

In step S40, the control circuit 220 stores the updated image of the operation of the shift lever 120 in the memory device 210. As a result, the previous image is updated by the updated image. The updating of the image may be performed every predetermined time (e.g., every thirty minutes) or every number of times (e.g., ten times) that the driver touches the shift lever 120.

In step S50, the monitoring system 200 provides the transmission control circuit 300 with the prohibition signal indicating that the operation of the shift lever 120 is invalid. The transmission control circuit 300 does not output the control signal that shifts ranges. Therefore, the range of the transmission 21 is not shifted.

In the second embodiment, the following advantages are obtained.

The monitoring system 200 uses the updated image generated by the CCD camera 130 with a previous image stored in the memory device 210 to determine whether the driver operated the shift lever 120 to shift ranges. When the driver did not operate the shift lever 120 to shift ranges, the monitoring system 200 determines that the operation of the shift lever 120 is invalid and provides the transmission control circuit 300 with the prohibition signal. Therefore, the range of the transmission 21 is not shifted and the present shift range is maintained. Since operations of the shift lever 120 other than those to shift ranges are invalidated, the reliability of range shifting is increased.

When the driver operates the shift lever 120 to shift ranges, the monitoring system 200 determines that the operation of the shift lever 120 is valid, provides the permission signal to the transmission control circuit 300, and updates the image in the memory device 210. Therefore, the updated image of the operation of the shift lever 120 by the driver to shift ranges is stored in the memory device 210. Accordingly, the newest operation of the shift lever is stored even though the driver gets used to the operation of the shift lever 120 and changes the way of operating the shift lever. This ensures the determination of whether the operation of the shift lever 120 is valid or invalid. Accordingly, the reliability of the range shifting is increased.

The images stored in the memory device 210 are only images of the operation of the shift lever 120. Therefore, the storing capacity of the memory device 210 may be relatively small. Accordingly, the monitoring system 200 is relatively inexpensive.

The second embodiment may be modified as follows.

When the CCD camera 130 generates an image of the shift lever 120 operated by a person other than the driver, the monitoring system 200 may send an invalidation signal to the transmission control circuit 300.

The shift device 11 may be a shift-by-wire type shift device having a stationary structure (holding type).

A device for monitoring the driver's view, or CCD cameras 43, may be arranged on a device used to view the rear, such as a room mirror 41 or a door mirror 42, as shown in FIG. 6. The image taken by the CCD camera 43 is processed by applying, for example, a line of sight input technique. Based on the image generated by the CCD camera 43, the monitoring system 200 determines that shifting to the reverse R range is valid only when the driver turns around to view the rear or stares at the room mirror 41, the door mirror 42, or the shift lever 120. In this structure, the vehicle may be driven toward the rear only when the driver confirms the rear side. Therefore, the vehicle is moved safely toward the rear. The CCD camera 43 may be arranged on a fender mirror instead of the door mirror 42. When the driver confirms the rear and operates the shift lever 120 to a position other than the R position (the D position, the N position), the range of the transmission 21 may forcibly be shifted to the R range.

The position of the CCD camera 130 may be changed. For example, the CCD camera 130 may be arranged on the ceiling of the passenger compartment (on or in the vicinity of a room lamp).

It is preferred that the CCD cameras 130, 43 be infrared cameras to guarantee the generation of images when the shift lever 120 is operated during the nighttime.

The CCD camera 130, 43 may be changed to be a CMOS camera.

The CCD camera 130 may be activated in response to the operation of the shift lever 120. This decreases the storing capacity of the memory device 210. Thus, the monitoring system 200 becomes further inexpensive.

The monitoring system 200 may be applied to a so-called track ball structure, touch structure, rotary structure, or column type shift device 11.

When the vehicle is used by a plurality of drivers, it is preferred that the memory device 210 stores images in association with drivers. For example, the control circuit 220 stores in the memory device 210 for each driver when the shift lever 120 is operated.

The driving of the vehicle may be permitted only after an operation image of the shift lever 120 is stored in the memory device 210. This guarantees that operation image of the shift lever 120 is stored in the memory device 210. Further, a volatile memory may be used as the memory device 210.

For long-distance driving, when the driver changes, the operation image of the shift lever 120 for the changed driver may be stored in the memory device 210. For example, a switch may be arranged in the passenger compartment to store images in the memory device 210 when a driver operates the shift lever 120 before the vehicle is driven. In this case, even when the vehicle is used by a plurality of drivers, the memory device 210 stores operation images generated for only a single driver. This decreases the storing capacity of the memory device 210.

The present examples and embodiments are to be considered as illustrative and not restrictive, and the invention is not to be limited to the details given herein, but may be modified within the scope and equivalence of the appended claims.

What is claimed is:

1. An apparatus for controlling a vehicle transmission, the apparatus comprising:
    a shift device operated by a driver to shift ranges of the transmission, wherein the shift device generates a signal indicating the shift operation of the driver; and
    a shift permission signal generating device for generating a signal when operated by the driver; and
    a determination device for judging whether the operation of the shift device is valid or not based on the signals received from the shift device and the shift permission signal generating device.

2. The apparatus for controlling a vehicle transmission according to claim 1, wherein the shift permission signal generating device includes a shift permission switch for providing the determination device with the operation signal when operated by the driver, wherein, when the operation signal is received and the shift device is operated, the determination device determines that the operation of the shift device is valid and permits the shifting of the transmission.

3. The apparatus for controlling a vehicle transmission according to claim 2, wherein the shift permission switch is arranged on a steering wheel.

4. The apparatus for controlling a vehicle transmission according to claim 3, wherein the shift permission switch is a push button switch, and wherein, when the shift device is operated during a period in which the shift permission switch is pushed or during a predetermined period after the shift permission switch is pushed, the determination device determines that the operation of the shift device is valid and permits the range shifting of the transmission.

5. The apparatus for controlling a vehicle transmission according to claim 3, wherein the shift permission switch is a pressure sensitive sensor arranged on a rim of the steering wheel, and wherein when the shift device is operated during a period in which the pressure sensitive sensor detects a pressure greater than a predetermined threshold value or during a predetermined period after the pressure sensitive sensor detects a pressure greater than the predetermined threshold value, the determination device determines that the operation of the shift device is valid and permits the range shifting of the transmission.

6. The apparatus for controlling a vehicle transmission according to claim 2, wherein the shift permission switch is a foot pedal arranged near operation pedals.

7. The apparatus for controlling a vehicle transmission according to claim 1, further comprising a contact sensor arranged in the shift device for providing the determination device with an operation signal in response to a contact, wherein, when the operation signal is received and the shift device is operated, the determination device determines that the operation of the shift device is valid and permits the shifting of the transmission.

8. The apparatus for controlling a vehicle transmission according to claim 1, further comprising an imaging device for generating an image of the operation of the shift device and providing the determination device with the generated image, wherein, when the image differs from a normal operation of the shift device, the determination device determines that the operation of the shift device is invalid and prohibits the range shifting of the transmission.

9. The apparatus for controlling a vehicle transmission according to claim 8, further comprising a memory device connected to the determination device for storing the image, wherein the determination device compares an updated image received from the imaging device and a previous image stored in the memory device and determines whether the operation of the shift device is valid.

10. The apparatus for controlling a vehicle transmission according to claim 9, wherein, when the updated image is substantially the same as the normal operation of the shift device, the determination device determines that the operation of the shift device is valid, permits the range shifting of the transmission, and updates the previous image with the updated image.

11. The apparatus for controlling a vehicle transmission according to claim 9, wherein the memory device stores the image in association with the driver.

12. The apparatus for controlling a vehicle transmission according to claim 1 wherein an imaging device monitors the driver's line of sight, wherein the determination device determines whether the operation of the shift device is valid using an image generated by the imaging device.

13. The apparatus for controlling a vehicle transmission according to claim 12, wherein the imaging device generates an image of the driver's line of sight, and the determination device uses the image of the driver's line of sight to determine whether the operation of the shift device is valid.

14. The apparatus for controlling a vehicle transmission according to claim 12, wherein the determination device determines that shifting to a reverse range is valid when the driver turns around to view the rear of the vehicle or stares at a room mirror, a door mirror, or a shift lever, based on the image of the driver's line of sight generated by the imaging device.

15. An apparatus for controlling a vehicle transmission, the apparatus comprising; a shift device operated between a plurality of operation positions by a driver; a shift permission switch for generating an operation signal when operated by the driver; and a control circuit for receiving the operation signal and validating the operation of the shift device when the shift device is operated.

16. The apparatus for controlling a vehicle transmission according to claim 15, wherein the shift permission switch is arranged on a steering wheel and is a push button switch that outputs the operation signal to the control circuit when pushed.

17. The apparatus for controlling a vehicle transmission according to claim 15, wherein the shift permission switch is a contact sensor arranged in the shift device, and the contact sensor generates the operation signal when detecting contact.

18. The apparatus for controlling a vehicle transmission according to claim 15 wherein the shift permission switch is a contact sensor arranged on a steering wheel, and the contact sensor generates the operation signal when detecting contact.

19. An apparatus for controlling a vehicle transmission, the apparatus comprising: ashiftdeviceoperatedbetweenapluralityofoperationpositionsbyadriver; an imaging device for generating an image of an operation of the shift device; and a determination circuit for determining whether the operation of the shift device is valid based on the image generated by the imaging device.

20. The apparatus for controlling a vehicle transmission according to claim 19, wherein, when the image differs from a normal operation of the shift device, the determination circuit determines that the operation of the shift device is invalid and prohibits the range shifting of the transmission.

21. The apparatus for controlling a vehicle transmission according to claim 20, further comprising a memory device connected to the determination circuit for storing the image, wherein the determination circuit compares an updated image received from the imaging device and a previous image stored in the memory device and determines whether the operation of the shift device is valid.

* * * * *